United States Patent [19]

Berkeley

[11] Patent Number: 5,035,152
[45] Date of Patent: Jul. 30, 1991

[54] SPEED INCREASER FOR WOODWORKING TOOLS

[75] Inventor: James E. Berkeley, Dayton, Ohio

[73] Assignee: Shopsmith, Inc., Dayton, Ohio

[21] Appl. No.: 483,698

[22] Filed: Feb. 23, 1990

[51] Int. Cl.5 .................. F16H 15/08; F16H 15/10
[52] U.S. Cl. ............................... 74/194; 74/416;
81/57.13
[58] Field of Search ............... 81/57.13, 57.27;
74/416, 194, 196, 197; 403/300; 464/162

[56] References Cited

U.S. PATENT DOCUMENTS

| | | | |
|---|---|---|---|
| 479,272 | 7/1892 | Harbaugh | 74/197 |
| 737,627 | 9/1903 | Herrick et al. | 74/197 |
| 909,372 | 1/1909 | De Loach | 74/197 |
| 1,219,553 | 3/1917 | Harrier | 74/197 |
| 1,861,303 | 5/1932 | De Yarman | 74/194 |
| 2,770,976 | 11/1956 | Frantz et al. | 74/194 |
| 2,921,479 | 1/1960 | Thomas | 74/194 X |
| 3,282,309 | 11/1966 | Parker et al. | 74/422 |
| 3,875,814 | 4/1975 | Steuer | 74/196 X |

FOREIGN PATENT DOCUMENTS 389555 11/1973 U.S.S.R. ............... 81/57.13

Primary Examiner—Allan D. Herrmann
Assistant Examiner—Julie A. Krolikowski
Attorney, Agent, or Firm—Biebel & French

[57] ABSTRACT

The present invention provides a compact speed increasing device which may be mounted upon the way tubes of a powered multi-purpose woodworking tool. The speed increasing device includes a horizontal input shaft for connection to the output spindle of the woodworking tool and a vertically oriented output shaft which includes a spindle for mounting a rotating shaper tool bit. The input shaft carries a rotating face plate having an elastomeric sheet attached to one side thereof which is provided for engagement with a drive ring mounted for rotation with the output shaft. The elastomeric sheet on the face plate is positioned in contact with the outer periphery of the drive ring such that rotation of the input shaft results in rotation of the output shaft and the shaper tool bit attached thereto. The drive ring contacts the elastomeric sheet along a circumference of the face plate which is greater than the outer circumference of the drive ring such that the output shaft is caused to rotate at a higher speed than the input shaft.

18 Claims, 2 Drawing Sheets

SPEED INCREASER FOR WOODWORKING TOOLS

BACKGROUND OF THE INVENTION

The present invention relates to speed increasing devices and, more particularly, to speed increasing devices for use with powered multi-purpose woodworking tools.

Multi-purpose woodworking tools typically include a frame, a pair of parallel way tubes extending along a longitudinal dimension of the frame, and a head stock mounted for slidable adjustment on the way tubes. The head stock includes a motor and power transmission system having an output spindle. The output spindle of the head stock may drive various woodworking tools such as shapers, lathes, table saws, disk sanders, jointers, band saws and the like, which are mounted on the way tubes.

An example of a typical multi-purpose woodworking tool is shown in U.S. Pat. No. 3,282,309 to Parker et al in which a variety of woodworking tools may be powered directly by the output spindle of the head stock of the machine. The head stock is typically provided with means for varying the speed of the output spindle to accommodate the requirements of the particular tool being used. Thus, a lower spindle speed may be used for operations such as lathe turning while a higher spindle speed is required for operations such as those performed by shaping tools. While such an arrangement is acceptable for many woodworking operations, the highest spindle speed available is often too low to perform shaping operations quickly and efficiently.

Further, when using a typical multi-purpose woodworking tool as a shaper, the head stock must be rotated to a vertical position over a worktable for supporting the workpiece, which may reduce the operator's ability to view the work area as well as the accessibility to the work area in certain applications.

Consequently, there is a need for a speed increasing device which may be attached to an existing powered woodworking tool having a head stock mounted on a pair of parallel way tubes and which is capable of driving a rotating shaping tool at a rotational speed substantially higher than that of the spindle of the multi-purpose woodworking tool.

In addition, a speed increasing device is needed which is compact enough to be supported by the way bars of a multi-purpose woodworking tool having a horizontal output spindle and which provides an output shaft oriented perpendicularly to the output spindle of the woodworking tool such that the output shaft may be used to support the bit of a shaping tool protruding through a top surface of a work support table.

SUMMARY OF THE INVENTION

The present invention provides a compact speed increasing device which may be mounted upon the way tubes of a powered multi-purpose woodworking tool. In addition, the present invention provides means for quickly connecting and disconnecting the speed increasing device to and from the woodworking tool.

In a preferred embodiment of the present invention, the speed increasing device is provided with a housing having front and rear portions for supporting input and output shafts of the device. The input shaft is located in the rear portion of the housing and is supported for rotation by a thrust bearing which is frictionally engaged with interior walls of the rear portion of the housing. The thrust bearing prevents the input shaft from moving axially relative to the housing.

The rear portion of the housing further includes a clamping portion which is sized to fit over the end of the head stock and output spindle of a multi-purpose woodworking tool so as to clamp the speed increasing device to the head stock. In addition, a clamp is attached to a lower portion of the front of the housing and is configured to engage both of the way tubes for vertically supporting and clamping the speed increasing device to the woodworking tool.

One end of the input shaft is provided with a coupling for connecting the input shaft to the horizontal output spindle of the power head. The opposite end of the input shaft has a face plate mounted thereto which includes a substantially planar surface facing toward the front of the housing. A sheet of elastomeric material such as polyurethane covers substantially the entire planar surface of the face plate and is held in place by a rigid metal plate which is of a lesser diameter than the sheet of elastomeric material such that a rim of the elastomeric material remains exposed.

The output shaft is mounted vertically within the front portion of the housing and is supported for rotation by upper and lower bearings. In addition, means are provided for attaching the output shaft to the upper bearing such that axial movement of the output shaft relative to the housing is limited.

A drive spindle is mounted to an upper end of the output shaft and includes a hole in an upper portion thereof for receiving a shaper tool bit. The spindle is further provided with holes for receiving set screws to lock the tool bit in position within the spindle.

A drive ring is located between the drive spindle and the upper bearing and includes a rounded outer peripheral portion. The rounded portion of the drive ring contacts a circular contact portion on the exposed rim of the elastomeric material as the input shaft rotates, and thereby defines a first circumference on the rim of the elastomeric material. The rounded outer portion of the drive rim forms a second contact portion which defines a second circumference smaller than the first circumference defined on the elastomeric material, such that rotation of the input shaft at a first speed results in the output shaft rotating at a second higher speed.

Other objects and advantages of the invention will be apparent from the following description, the accompanying drawings, and the appended claims.

DETAILED DESCRIPTION OF THE PREFERRED EMBODIMENT

Figure 1:
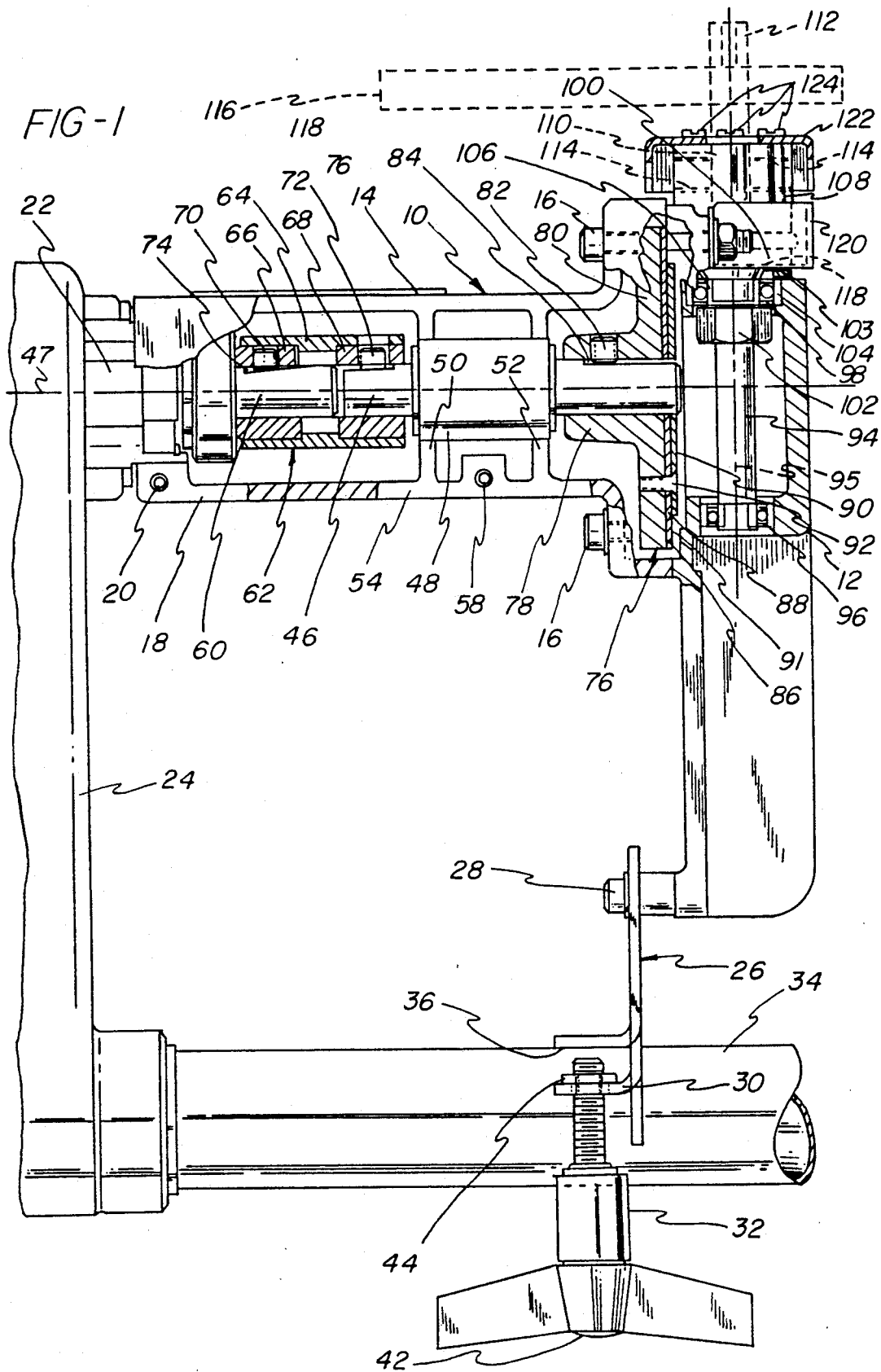
FIG. 1 is a side elevational view of the speed increasing device of the present invention shown in partial cross section to reveal essential operating elements of the device.

Referring to FIG. 1, the speed increasing device of the present invention includes a housing 10 having a front portion 12 and a rear portion 14 which are joined together by a plurality of bolt assemblies 16.

The rear housing portion 14 is provided with a clamping portion which includes an elongated slot, one wall of which is shown at 18, which facilitates positioning the clamping sleeve over an end 22 of the head stock 24 of a multi-purpose woodworking tool. A fastener 20 is provided for tightening the clamping portion around the end 22 of the head stock 24 such that the housing 10 is maintained in position relative to the head stock 24.

Figure 2:
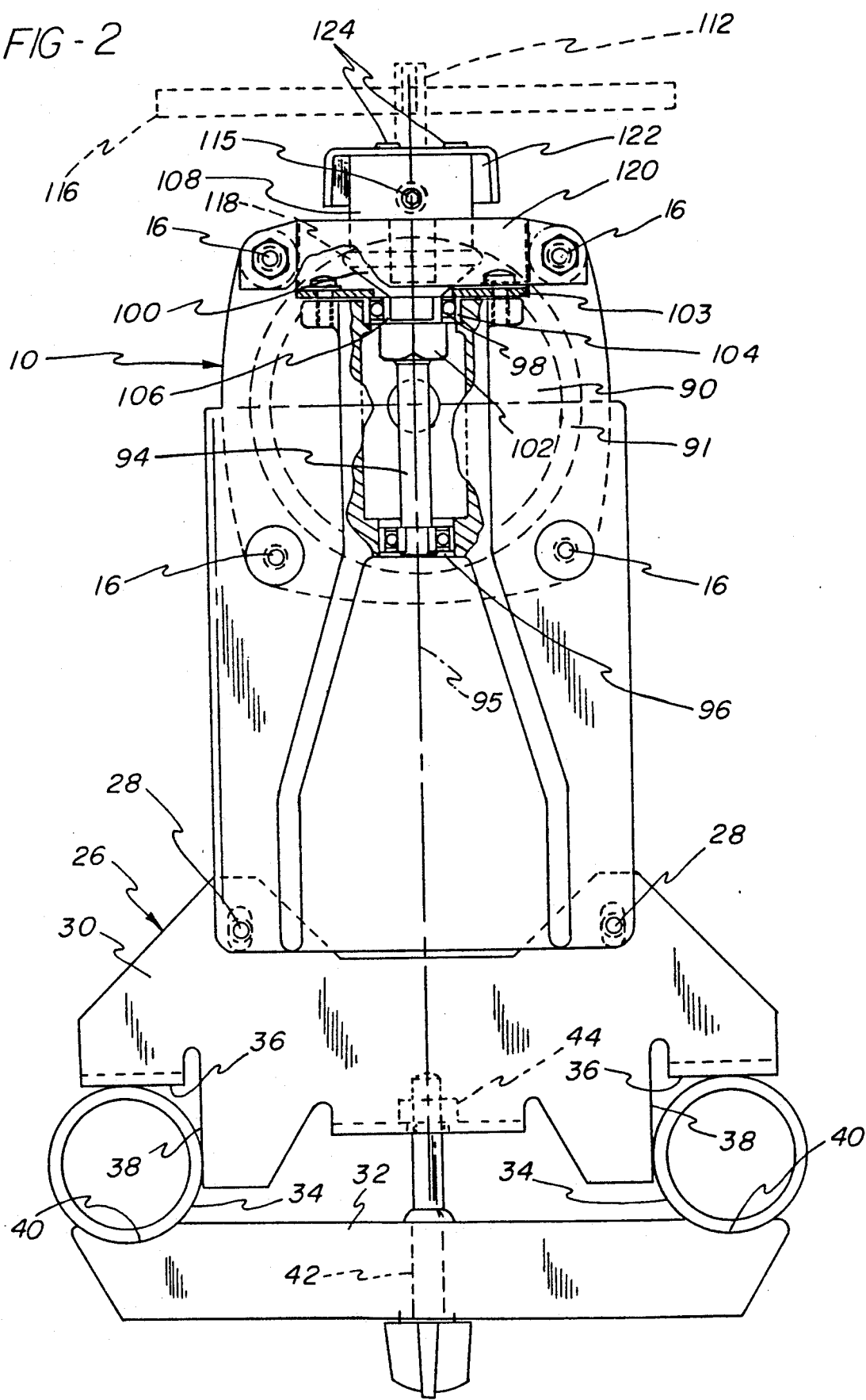
FIG. 2 is a front elevational view of the device in partial cross section.

As may be seen in FIGS. 1 and 2, a supporting clamp 26 is attached to the front housing portion 12 by means of bolts 28 and includes a top clamp portion 30 and a bottom clamp portion 32. The top and bottom clamp portions 30, 32 extend transverse to and engage a pair of parallel way tubes 34 which also support the head stock 24 of the woodworking tool. The upper clamp portion 30 includes top and side portions 36, 38, respectively, for engaging the top and side of each of the way tubes 34, and the lower clamping portion 32 includes arcuately shaped portions 40 for engaging the bottoms of the way tubes 34. A screw member 42 is positioned below and passes through the lower clamping portion 32 and engages a threaded element 44 positioned on the upper clamping portion 30 such that the screw element 42 may draw the upper and lower clamping portions 30, 32 together to firmly hold and vertically support the housing in place upon the way tubes 34.

An input shaft 46 defining a substantially horizontal longitudinal axis 47 is positioned within the rear housing portion 14 and is supported by a thrust bearing 48. The thrust bearing is supported by a pair of inwardly extending interior walls 50, 52 of the rear portion 14 which hold the bearing 48 in place by means of frictional contact between the walls 50, 52 and the outer wall of the bearing 48. In order to facilitate mounting and positioning of the bearing 48 within the rear housing portion 14, a slot 54 is provided in the housing wall adjacent to the location of the bearing 48 whereby a fastener 58, also located adjacent to the bearing 48, may be used to draw opposing sides of the slot 54 together to thereby contract the walls 50, 52 around the bearing 48. In addition, it should be noted that the input shaft 46 is rigidly attached to an inner race of the thrust bearing 48 such that the bearing 48 positions the input shaft 46 and prevents it from moving in an axial direction relative to the housing 10.

One end of the input shaft 46 is connected to an output spindle 60 of the head stock 24 by means of a coupling assembly 62. The coupling assembly 62 includes a connecting sleeve 64 with front and rear inserts 66, 68 positioned at either end of the sleeve 64. A pair of set screws 70, 72 pass through the sleeve 64 and the inserts 66, 68 to engage flat keyed portions 74, 76 formed in the input shaft 46 and the output spindle 60, respectively. In addition, the rear housing portion 14 may be formed with apertures (not shown) to permit access to the clamping screws 74, 76 for facilitating attachment and detachment of the coupling assembly 62 to and from the output spindle 60 and the input shaft 46.

An end of the input shaft 46 adjacent to the front housing portion 12 supports a face plate 76 for rotation with the shaft 46. The face plate 76 includes a sleeve portion 78 and a substantially circular drive portion 80. A set screw 82 located within the sleeve portion 78 engages a flat keyed portion 84 of the input shaft 46 such that the base plate 76 is rigidly attached to the input shaft 46 for rotation therewith about the horizontal axis 47.

The face plate 76 includes a substantially planar surface 86 which faces toward the front housing portion 12. A sheet 88 formed of an elastomeric material such as polyurethane is positioned such that it covers substantially the entire face 86 and is held in place on the face 86 by a substantially circular rigid metal mounting plate 90. The rigid plate 90 is attached to the face plate 76 by a plurality of fasteners 92 which extend through the rigid plate 90 and the sheet of elastomeric material 92 to engage in the drive portion 80 of the face plate 76. The rigid plate 90 is formed with a smaller diameter than that of the elastomeric material 88 and the drive portion 86 of the face plate 76 such that a circular rim 91 of the elastomeric material 88 covering the surface 86 is exposed for purposes to be described below.

The front housing portion 12 encloses an output shaft 94 which is supported for rotation about a vertical axis 95, perpendicular to the horizontal axis 47, by a lower bearing 96 and an upper bearing 98 through which the output shaft 94 passes. The upper end of the output shaft 94 includes a shoulder portion 100 which tapers upwardly and outwardly from the upper end of the upper bearing 98. The output shaft 94 further includes a threaded portion below the upper bearing 98 and a locking jam nut 102 threaded onto the threaded portion of the output shaft 94. The jam nut 102 is formed of a smaller diameter than an outer race 104 of the bearing 98 such that, as the nut 102 is rotated to move toward the shoulder portion 100, the shoulder portion 100 and the nut 102 are caused to engage an inner race 106 of the bearing 98 and thereby hold the shaft 94 rigidly in place on the bearing 98. In addition, the upper bearing 98 is held in place on the top of the front housing portion 12 by a plate 103 such that the upper bearing 98 acts to prevent the output shaft 94 from moving in an axial direction relative to the housing 10.

A drive spindle 108 is mounted to an upper end of the output shaft 98 and includes means defining a hole 110 in the upper portion thereof such that the spindle 108 may receive a shaper tool bit 112. In addition, the spindle 108 is provided with apertures 114 for receiving set screws 115 to hold the shaper tool bit 112 in place within the hole 110. It should be apparent that by positioning the output shaft 94 along the vertical axis 95, the present invention provides a vertical tool drive in which the tool bit 112 may be used on conjunction with a horizontal workpiece support table 116.

A drive ring 118 having a rounded outer peripheral surface is located between the shoulder portion 100 and the drive spindle 108. The drive ring 118 has a diameter greater than that of the output shaft 94 and of the spindle 108 and the outer peripheral surface is formed as a generally smooth surface positioned for contacting the circular rim area 91 of the elastomeric sheet 88 which also is formed as a generally smooth surface. The thrust bearing 48 maintains the circular rim portion 91 of the elastomeric sheet 88 in contact with the outer peripheral surface of the drive ring 118 to generate a predetermined frictional force between the portion 91 and the drive ring 118 whereby rotation of the face plate 76 by the drive shaft 46 results in rotation of the drive ring 118 and output shaft 94, thereby rotating the tool bit 112.

It should be noted that a first circumference defined on the elastomeric sheet 88 by the points of contact between the rim portion 91 and the drive ring 118 is greater than a second circumference of contact points on the drive ring 118 such that the output shaft 94 rotates at a higher speed than that of the input shaft 46. In a typical application of the invention, the input shaft is rotated at a speed of 4,700 rpm and the relative circumferences of contact points on the elastomeric sheet 88 and the drive ring 118 are selected such that the output speed of the output shaft 118 is approximately 10,000 rpm. Thus, the output shaft speed is increased by more than a factor of 2 over the speed of the input shaft.

Referring to FIG. 2, it can be seen that the housing is further provided with a semi-circular shaped spindle guard 120 which is attached to the housing by the bolt assemblies 16 on opposite sides of the spindle, and a slinger 122 is attached to the top of the spindle 108 by means of fasteners 124. The spindle guard 120 and slinger 122 act to prevent sawdust and wood chips from falling into the drive mechanism of the speed increaser.

The friction drive contact between the elastomeric material 88 and the drive ring 118 of the present invention forms a quiet drive mechanism for rotating the output shaft 94 at relatively high speeds as well as provides means for allowing slippage between the input and output shafts should the tool bit 112 become jammed in a workpiece, and thus helps prevent damage to the power transmission system of the woodworking tool. It should also be noted that by forming one of the contact surfaces of the drive means of an elastomeric material, positive frictional contact is obtained between the contact surfaces such that transmission losses due to slippage are minimized.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A speed changing device for connection to a woodworking tool having a headstock and an output spindle, said speed changing device comprising:
   a housing having a front portion and a rear portion;
   an input shaft supported for rotation within said rear portion of said housing;
   an output shaft supported for rotation within said front portion of said housing;
   a drive spindle attached to an end of said output shaft, said drive spindle including means defining a hole for receiving a rotatable tool bit,
   a first substantially circular drive means attached to said input shaft for rotation therewith, said first drive means including a first contact portion defining a first circumference;
   a second substantially circular drive means attached to said output shaft for rotation therewith, said second drive means including a second contact portion defining a second circumference different from said first circumference of said first contact portion;
   said first contact portion contacting said second contact portion whereby a frictional force is created between said first and second contact portions such that rotation of said input shaft at a first speed results in rotation of said output shaft at a second speed different from said first speed,
   a coupling assembly for connecting said output spindle of said woodworking tool to said input shaft, said coupling assembly fitting over said output spindle and an end of said input shaft; and
   a clamping portion at said rear portion of said housing for attaching said rear portion to said headstock of said woodworking tool.

2. The device of claim 1 wherein said first and second drive means rotate about axes which are substantially perpendicular to each other.

3. The device of claim 1 wherein said first and second drive means are formed as smooth surfaces.

4. The device of claim 3 wherein at least one of said first and second contact portions is formed of an elastomeric material whereby slippage between said first and second contact portions is decreased.

5. The device of claim 3 or 4 wherein one of said first and second drive means includes a substantially circular planar face forming one of said first and second contact portions, and the other of said first and second drive means includes an outermost peripheral surface forming the other said contact portion.

6. The device of claim 5 wherein said first circumference is larger than said second circumference such that said output shaft rotates at a higher speed than said input shaft.

7. The device of claim 1 including a lower clamp attached to said front portion for vertically supporting and attaching said speed changing device to said woodworking tool.

8. The device of claim 1 wherein said first drive means includes a substantially circular planar face with a substantially circular elastomeric sheet having a first diameter positioned on said substantially planar face, and a substantially circular mounting plate having a second diameter smaller than said first diameter positioned on said elastomeric sheet and held in position on said mounting plate by fastening means such that said elastomeric sheet is held in place.

9. A speed changing device for connection to a woodworking tool having an output spindle, said speed changing device comprising:
   a housing having a front portion and a rear portion;
   an input shaft and an output shaft supported by said housing for rotation;
   a drive spindle mounted to an end of said output shaft for rotation with said output shaft, said drive spindle including means defining a hole for receiving a rotatable tool bit therein;
   first drive means attached to said input shaft, said first drive means including a first friction surface;
   second drive means attached to said output shaft, said second drive means including a second friction surface;
   said first and second drive means being positioned such that said first friction surface engages said second friction surface whereby rotation of said input shaft results in rotation of said output shaft;
   means for maintaining said first drive means in axial position relative to the housing whereby a predetermined frictional force is maintained between said first and second drive means, and
   a coupling assembly for connecting said output spindle of said woodworking tool to said input shaft, said coupling assembly fitting over said output spindle and an end of said input shaft.

10. The device of claim 9 wherein said first and second friction surfaces are generally smooth surfaces.

11. The device of claim 10 wherein said first and second drive means rotate about axes which are substantially perpendicular to each other.

12. The device of claim 9 wherein one of said first and second friction surfaces is formed of an elastomeric material.

13. The device of claim 9 wherein said first and second friction surfaces are generally smooth surfaces.

14. The device of claim 9 wherein said output shaft rotates at a higher speed than said input shaft.

15. The device of claim 9 wherein said means for maintaining said first drive means in axial position relative to the housing includes a thrust bearing attached to said input shaft.

16. The device of claim 9 including a lower clamp attached to said front portion for vertically supporting and attaching said speed changing device to said woodworking tool.

17. The device of claim 9 wherein said first drive means includes a substantially circular planar face with a substantially circular elastomeric sheet having a first diameter positioned on said substantially planar face, and a substantially circular mounting plate having a second diameter smaller than said first diameter positioned on said elastomeric sheet and held in position on said mounting plate by fastening means such that said elastomeric sheet is held in place.

18. A speed increasing device for connection to a multipurpose woodworking tool having a head stock with a horizontal output spindle, said speed increasing device comprising:

a housing having a front and a rear portion and means for holding said front and rear portions together;

said rear portion including a clamping portion for attaching said rear portion to said head stock of said woodworking tool;

a lower clamp attached to said front portion for vertically supporting and attaching said speed increasing device to said woodworking tool;

a substantially horizontal input shaft passing through said rear portion from said clamping portion toward said front portion;

a coupling assembly for connecting said output spindle of said woodworking tool to said input shaft, said coupling assembly fitting over said output spindle and an end of said input shaft and including a pair of set screws for engaging said spindle and said input shaft;

a thrust bearing having an outer surface in tight fitting contact with an interior surface of said rear portion of said housing and supporting said input shaft for rotation, said thrust bearing further holding said input shaft against axial movement within said rear portion of said housing;

a face plate attached to an end of said input shaft opposite from said end attached to said coupling assembly, said face plate including a substantially planar circular face;

a substantially circular elastomeric sheet having a first diameter positioned on said substantially planar face;

a substantially circular mounting plate having a second diameter smaller than said first diameter positioned on said elastomeric sheet and held in position by a plurality of fasteners passing through said mounting plate, said elastomeric sheet and said face plate such that said elastomeric sheet is held in place;

a substantially vertical output shaft passing through said front portion and extending upwardly out of said housing;

upper and lower bearings mounted in said front portion for supporting said output shaft for rotation;

said output shaft including a shoulder portion tapering upwardly and outwardly from an upper surface of said upper bearing and a threaded portion located below a lower surface of said upper bearing;

a locking nut positioned on said threaded portion of said output shaft for drawing said shoulder portion into contact with said upper bearing whereby said output shaft is held against axial movement within said front portion of said housing;

a drive spindle mounted to an upper end of said output shaft above said shoulder portion, said spindle including means defining a hole in an upper portion thereof for receiving a shaper tool bit;

a drive ring located between said shoulder portion and said spindle, said drive ring having a diameter greater than said output shaft and including a smooth outer peripheral surface engaging a first contact portion on said elastomeric sheet thereby defining a first circumference on said elastomeric sheet such that rotation of said input shaft and said face plate results in rotation of said output shaft and said drive spindle; and said outer peripheral surface of said drive ring defining a second contact portion having a second circumference smaller than said first circumference such that said output shaft rotates at a higher speed than said input shaft.

* * * * *

UNITED STATES PATENT AND TRADEMARK OFFICE
CERTIFICATE OF CORRECTION

PATENT NO. : 5,035,152

DATED : July 30, 1991

INVENTOR(S) : James E. Berkeley

It is certified that error appears in the above-identified patent and that said Letters Patent is hereby corrected as shown below:

Col. 6, line 1, claim 13, "9" should be changed to --12--.

Signed and Sealed this

Sixteenth Day of February, 1993

*Attest:*

STEPHEN G. KUNIN

*Attesting Officer*  *Acting Commissioner of Patents and Trademarks*